US008025564B2

(12) United States Patent
Jackson

(10) Patent No.: US 8,025,564 B2
(45) Date of Patent: Sep. 27, 2011

(54) DUAL-USAGE BONUS POINT METHOD FOR GAMING MACHINES

(75) Inventor: Kathleen Nylund Jackson, Scituate, MA (US)

(73) Assignee: Precedent Gaming, Inc., Scituate, MA (US)

( * ) Notice: Subject to any disclaimer, the term of this patent is extended or adjusted under 35 U.S.C. 154(b) by 561 days.

(21) Appl. No.: 12/229,053

(22) Filed: Aug. 19, 2008

(65) Prior Publication Data

US 2009/0054134 A1 Feb. 26, 2009

Related U.S. Application Data

(60) Provisional application No. 60/965,445, filed on Aug. 20, 2007.

(51) Int. Cl.
*G06F 17/00* (2006.01)

(52) U.S. Cl. .......................................................... 463/20

(58) Field of Classification Search ............... 463/16–25
See application file for complete search history.

(56) References Cited

U.S. PATENT DOCUMENTS

| | | | | |
|---|---|---|---|---|
| 5,772,509 | A | 6/1998 | Weiss | 463/16 |
| 5,908,354 | A | 6/1999 | Okuniewicz | 463/35 |
| 6,234,895 | B1 | 5/2001 | Jones et al. | 463/13 |
| 6,869,361 | B2 | 3/2005 | Sharpless et al. | 463/25 |
| 6,887,154 | B1 | 5/2005 | Luciano, Jr. et al. | 463/26 |
| 7,169,041 | B2 | 1/2007 | Tessmer et al. | 463/16 |
| 7,223,172 | B2 | 5/2007 | Baerlocher et al. | 463/16 |
| 7,326,115 | B2 * | 2/2008 | Baerlocher | 463/25 |
| 7,481,709 | B2 * | 1/2009 | Bussick et al. | 463/20 |
| 7,503,851 | B2 * | 3/2009 | Walker et al. | 463/26 |
| 7,887,410 | B2 * | 2/2011 | Okada | 463/20 |
| 7,887,414 | B2 * | 2/2011 | Walker et al. | 463/26 |
| 2005/0014553 | A1 | 1/2005 | Byrne | 463/18 |
| 2006/0052162 | A1 | 3/2006 | Soukup et al. | 463/27 |
| 2006/0281516 | A1 | 12/2006 | Duhamel et al. | 463/16 |
| 2007/0004505 | A1 | 1/2007 | Walker et al. | 463/26 |
| 2007/0026924 | A1 | 2/2007 | Taylor | 463/16 |
| 2007/0054728 | A1 | 3/2007 | Hood | 463/16 |
| 2007/0072673 | A1 | 3/2007 | Bennett et al. | 463/25 |
| 2007/0077990 | A1 | 4/2007 | Cuddy et al. | 463/25 |

* cited by examiner

*Primary Examiner* — Ronald Laneau
(74) *Attorney, Agent, or Firm* — Mark A. Litman & Associates, P.A.

(57) ABSTRACT

A method of mechanical, electromechanical or video slot play on networked gaming machines is disclosed. The method comprises a base game, a progressive jackpot opportunity and a dual-usage point system. The point system feature allows the player the flexibility to choose to either redeem the points for benefits (i.e., cash, credits, casino player points, free spins, and the like) or save the points as entries into a progressive prize-related lottery.

19 Claims, 9 Drawing Sheets

SAMPLE BONUS POINT REDEMPTION CHART

Redeem bonus points for any of the following:

- CREDITS — Redeem 5 points for 1 credit
- SPECIFIC CREDIT MULTIPLIERS —
  Redeem points to multiply any credit wins in next game:
  20 points for a 2x multiplier, 30 points for 3x, or
  50 points for a 5x multiplier
- RANDOM CREDIT MULTIPLIERS —
  Redeem points to multiply any credit wins in next game:
  50 points for randomly one of the following: 3x,5x,10x or 25x
- FREE SPINS — Redeem 25 points for 1 free spin
- PLAYER CLUB POINTS — Redeem 2 points for 1 player club point

600

*Fig. 9*

DUAL-USAGE BONUS POINT METHOD FOR GAMING MACHINES

RELATED APPLICATION DATA

This Application claims priority from U.S. Provisional Patent Application No. 60/965,445, filed Aug. 20, 2007.

BACKGROUND OF THE INVENTION

1. Field of the Invention

The present invention relates to a slot symbol game suitable for use in casinos and other gaming enterprises. The invention further relates to mechanical, electromechanical or video gaming play that provides, in addition to traditional credits or awards, bonus points that can be optionally redeemed for benefits or saved as entries in a progressive game-related event.

2. Background of the Art

Gaming machines, and in particular slot machine games, have grown exponentially in numbers in the last twenty years, as have the revenues generated by such devices. Since it is estimated that at least 70% of any casino's revenue are now provided by gaming machines, there is increasingly fierce competition among the machine manufacturers to attract and maintain customers with game content.

Slot manufacturers strive to differentiate their machines by adding unique features and methods, and these proprietary innovations are designed to initially attract a player to a particular slot machine and then retain the player's interest for protracted periods of time.

Especially in the last decade, primary or base machine games have been augmented by special features that are particularly popular with the gaming public. Two of the most popular features are known in the art as bonus game play and progressive game play. Bonus game play may consist of certain enhancements to the base game play, such as free spins and multipliers, or it may add a separate bonus game event that either replaces the base game on the screen or is displayed in a second screen. In many cases the awards that may be won in a bonus game are more lucrative than base game pays, so the player is encouraged to play for longer periods until the bonus opportunity is achieved. Progressive game play usually involves linking slot machines in a network, with a portion of each player's wager being utilized to fund a jackpot award. The jackpot award most commonly starts at a minimum (or "seed") amount, and increases as each wager is made. When a player hits a "triggering event" (e.g., a particular symbol combination along a particular wagered payline, or a particular number of scatter pay symbols, for instance), the player wins the progressive jackpot, which can be a life-changing amount. Even though the base game payouts are usually decremented or reduced in comparison to games without jackpot events to allow for the incrementing contributions to the jackpot, progressive game play remains enormously popular due to jackpots that can reach well into the millions of dollars.

Certain prior art has attempted to enhance the known slot machine game play.

U.S. Pat. No. 7,223,172 (Baerlocher, et al.) provides a gaming device having a bonus scheme, wherein the player may choose when to play a bonus scheme, so long as the player is qualified to do so. The method of qualifying the player to enter the bonus round connects or links the base game operation of the gaming device with the bonus scheme. The reels of the base game contain symbols which alone or in combination with other symbols yield one or more bonus awards to a player. The bonus awards are escrowed and displayed a bonus award escrow display. Once the player obtains a single bonus award, the player becomes eligible or qualified to play the bonus round and the player may choose to do so at any time. The player can accumulate bonus awards and use multiple bonus awards at one time.

U.S. Pat. No. 7,169,041 (Tessmer, et al.) provides a method of weighting odds in shared bonus events and gaming systems and devices configured for weighting odds in shared bonus events. A number of participations or entries by the same gaming machine or player entity may be obtained for a shared bonus event in association with play of a base or primary game, allowing the odds of winning the shared bonus event to be weighted.

U.S. Pat. No. 6,887,154 (Luciano, et al.) discloses a progressive system (local and wide area) where a primary and secondary progressive meter is maintained. When a progressive win event occurs, there are two payouts: the first payout (defined by the primary meter) is paid to the player triggering the progressive payout event; the second payout (defined by the secondary meter) is paid to other players (or game devices) having "active" or "enrolled" status at the time of the primary payout event. The method automates the "shared" win, including means for readily determining "active" players. The progressive prizes may be funded using traditional methods (e.g., percentage of wagers, marketing budget). The progressive prizes may also be funded using expired prizes which have expired or lapsed.

U.S. Pat. No. 6,869,361 (Sharpless, et al.) includes a system, apparatus and method for providing a bonus game which may be shared competitively, collaboratively or both among a plurality of players. Each player participating in the bonus game generates entries thereto in association with play of a base, or primary, game played on an individual gaming device. Players may also reintroduce entries for the bonus game that were generated on a gaming device at an earlier time to a different gaming device. Each gaming device is in communication with a controller that operates the shared bonus game and may communicate with or integrate a player tracking system. During the shared bonus game, the controller is configured to randomly select a bonus award amount that may be consistent with the par sheets, or pay tables, associated with the gaming devices, or separate therefrom. The controller is also configured to randomly select a winning entry from among all of the qualified entries and provide the bonus award amount to the player that placed the winning entry.

U.S. Pat. No. 6,234,895 (Jones, et al.) discusses a method for including a progressive jackpot component in a live casino table game. In addition to playing a live casino table game, each player makes an additional wager at the beginning of each hand that makes that player eligible to win all or part of a jackpot. If during the play of the hand a player is dealt a predetermined arrangement of cards, the player wins a preselected percentage of the jackpot amount. The jackpot is progressive in that undistributed amounts of the jackpot carry over to the next hand. Apparatus is provided to receive each gaming token wagered for the jackpot component, to increment the jackpot meter which displays the jackpot amount, to decrement the jackpot meter whenever a winning hand is paid and to reset the apparatus for the next hand.

United States Patent Application No. 20070077990 (Cuddy, et al.) discloses a gaming system including a central server linked to a plurality of gaming machines. Upon a suitable triggering event at a triggering gaming device in the gaming system a bonus event occurs. When the bonus event occurs, the players actively playing each auxiliary gaming device in the gaming system are each provided a chance to participate in the bonus event as well. Each remaining gaming device's chance of participating in the bonus event is based on the individual accumulated bonus event pool for that gaming device.

United States Patent Application No. 20070072673 (Bennett, et al.) discloses a gaming machine that has a display and a game controller arranged to control images displayed on the display. The game controller is arranged to play a game wherein one or more random events arc caused to be displayed on the display and, if a predefined winning event results, the machine awards a prize which is credited to a credit meter of the machine. The credit meter includes two meter displays, a first meter display indicating credit which is available for expenditure in the machine to play at least one game and a second meter display indicating credit set aside by at least one of a player and the game controller and which credit is unavailable to the player for wagering on a game but which is only available by termination of a playing session.

United States Patent Application No. 20070054728 (Hood) describes a gaming device and method in which a portion of each wager is divided between at least two escrow accounts. One account may serve as a conventional progressive pool (possibly networked across a number of gaming devices), while another may serve as a gaming device or player specific cache account. When the player achieves a predetermined winning combination he triggers a game feature, the "Progressive Challenge," in which the player may elect to exercise the option to wager none, some or all of the amount in the device specific cache account in an attempt to win some or the entire amount in the conventional progressive pool account. If the player fails to win, the amount the player wagered from the device specific cache may be transferred to the conventional progressive pool. In accordance with a preferred embodiment, a portion of each wager is divided between two escrow accounts. One account serves as a conventional progressive pool (possibly networked across a number of gaming devices), while the other serves as a gaming device specific cache account. When the player hits a predetermined winning combination he triggers a game feature, the "Progressive Challenge," in which the player is given the option to wager either some or all of the amount in the device specific cache account in an attempt to win some or the entire amount of the conventional progressive pool account. If the player fails to win, the amount the player wagered from the device specific cache is transferred to the conventional progressive pool.

United States Patent Application No. 20070026924 (Taylor) teaches a gaming device wherein various events pay players in multiple classes of credits. One class of special credits has no cash value and may only be rewagered in an attempt to win traditional cash-equivalent credits. The player decides when to play a bonus game where the special credits are bet.

United States Patent Application No. 20070004505 (Walker, et al.) describes a method for providing entry into a bonus game at a gaming device, where the bonus games may occur at predictable times and may payout predictable amounts. In one or more embodiments, a gaming device may provide a guaranteed entry into a bonus game every hour on the hour, so long as a player meets one or more criteria. Criteria may include a total amount wagered, a total number of handle pulls completed, or a total amount of time spent at a gaming device. One or more embodiments provide a method for withholding value from a player in order that the value may be delivered later in the form of a guaranteed entry into a bonus game. One or more embodiments provide a method whereby multiple gaming devices may provide entry in bonus rounds simultaneously, thereby creating mutually reinforcing sounds and visual displays.

United States Patent Application No. 20060281516 (Duhamel, et al.) discloses a method of providing a feature game using a primary game outcome, comprising: evaluating a primary game outcome according to feature game rules, and when the primary game outcome comprises a feature-point-awarding outcome, modifying a total feature point value. The total feature point value is compared to a target range of values and a feature prize is awarded if the total feature point value is comprised in the target range of values.

United States Patent Application No. 20060052162 (Soukup, et al.) teaches a system and method establish a progressive jackpot award associated with a machine useable by a user. The user has a user account stored in a computer connected to the machine. The computer includes a database for storing user account data including bonus points associated with the user. The progressive jackpot award has an associated payout value. The user uses the bonus points on the machine and an incremental number is added to the payout value of the progressive jackpot award as a function of the number of bonus points used by the user.

United States Patent Application No. 20050014553 (Byrne) discloses a collateral gambling game which can be won by players on, at least, one specific event occurring in the principal game; the collateral game being separate from the principal game, but won when any of the possible winning events occur in the principal game, with the payment to the player being calculated from the total value available for the game divided by the total number of players who bet on the specific winning event. The game gives a possibility for a large number of players to share in the success of a single player who has successfully won the main game. It may be used with various types of games, including those using electronic gaming machines.

SUMMARY OF THE INVENTION

A method and apparatus for mechanical, electromechanical, electronic, internet, single unit platform or multiplayer platform or video slot play on networked gaming machines is disclosed. The method comprises playing a base game having both a progressive jackpot opportunity and a dual-usage non-monetary point system. The player makes a wager to play the base game, the base game preferably comprising providing random symbols used in providing random outcomes against a paytable, such as by providing random frames or multiple spinnable reels with indicia thereon that may be positioned in a grid, preferably as a matrix of rows and columns, or that may be positioned in other symmetric, asymmetric or random patterns. A portion of the wager may be directed to fund a progressive jackpot prize or prizes or a side bet will fund the progressive jackpot and/or additional game features such as bonus events. An additional wager or side bet may be required for the opportunity to utilize what is referred to herein as the dual-usage bonus point feature. After the wager(s) is made, the game is initiated, and a final symbol result is shown. The final symbol result is first analyzed for winning symbol combinations according to a first predetermined paytable, and any winning combinations are paid in monetary units or credits into the player's individual credit account, and displayed on a corresponding credit meter. Simultaneously, or nearly simultaneous to the first analysis, a second analysis is performed to determine any winning symbol combinations according to a second paytable. Winning symbol combinations in the first paytable may be determined on a distinctly different and separate basis than the winning symbol combinations in the second paytable. For example, the base game first paytable may be for high ranked poker hands, while the second paytable may be for total points (counting and summing individual points in a hand), a low hand poker game, reading secondary symbols on playing card images (e.g., random letters on poker cards that can be used to form words or phrases in a secondary game), additional symbols on the poker cards that can be combined to form images and/or special non-poker symbols that have separate paytables for combinations of those non-poker images (as in typical reel-type slot machine symbols of 7's, bars, etc.). Additionally, winning symbol combinations in the first paytable may be distinctly different and separate from winning symbol combinations in the second paytable. It is not a requirement for the second analysis that the first analysis achieve a winning result according to the first paytable. Winning symbol combinations determined by the second analysis are paid in non-monetary bonus points into the player's individual bonus point account and displayed on a corresponding bonus point meter, which is separate from and displayed separately from the player's individual credit meter. Bonus points may accumulate from game to game, and may increment until the player chooses to utilize them. It is also possible, in view of player account monitoring at casinos, for these non-monetary bonus point accounts to be accumulated for use in subsequent play of games having similar non-monetary point play available. The bonus point system feature allows the player the flexibility to choose to either redeem the points for value or benefits (i.e., cash, credits, casino player points, comp ratings, free spins, and the like) or save the points to be used as entries in a progressive prize-related lottery.

A method of game play is described for use in a gaming system using a processor to store credits. The method comprises:

a player placing an at least first wager to play in an underlying game in which symbols are provided to players making the at least first wager;

each player receiving at least one set of symbols in a round of play;

each at least one set of symbols for each player is evaluated according to a first paytable and a first determination is made as to whether the at least one set of symbols is a winning or losing event, and the first wager is resolved on a cash or credit basis based on the first determination;

each set of the at least one set of symbols is then evaluated according to a second paytable and a second determination is made as to whether the each set of at least one set of symbols is a winning or losing event, and the first wager or a second wager is resolved on a non-cash or non-credit basis based on the second determination;

cash and credit balances are maintained by the processor in a first account and non-cash and non-credit balances from the second determination are maintained in a separate account distinct from the first account; and non-cash and non-credit balances are either redeemable by each player for benefits or saved as potential entries in a progressive jackpot-related event.

Those trained in the art will appreciate that these play options are exemplary of a generic concept and that specifically described components, steps or rules are not intended to limit the invention or dictate an exclusive method of play, nor limit or restrict specific gameplay or the claims.

It is an objective of the present invention to improve on the prior art and provide players with choices in the redemption and/or banking of non-monetary points.

BRIEF DESCRIPTION OF THE FIGURES

FIG. 9 shows a sample Point Redemption Chart.

DETAILED DESCRIPTION OF THE INVENTION

Figure 1:
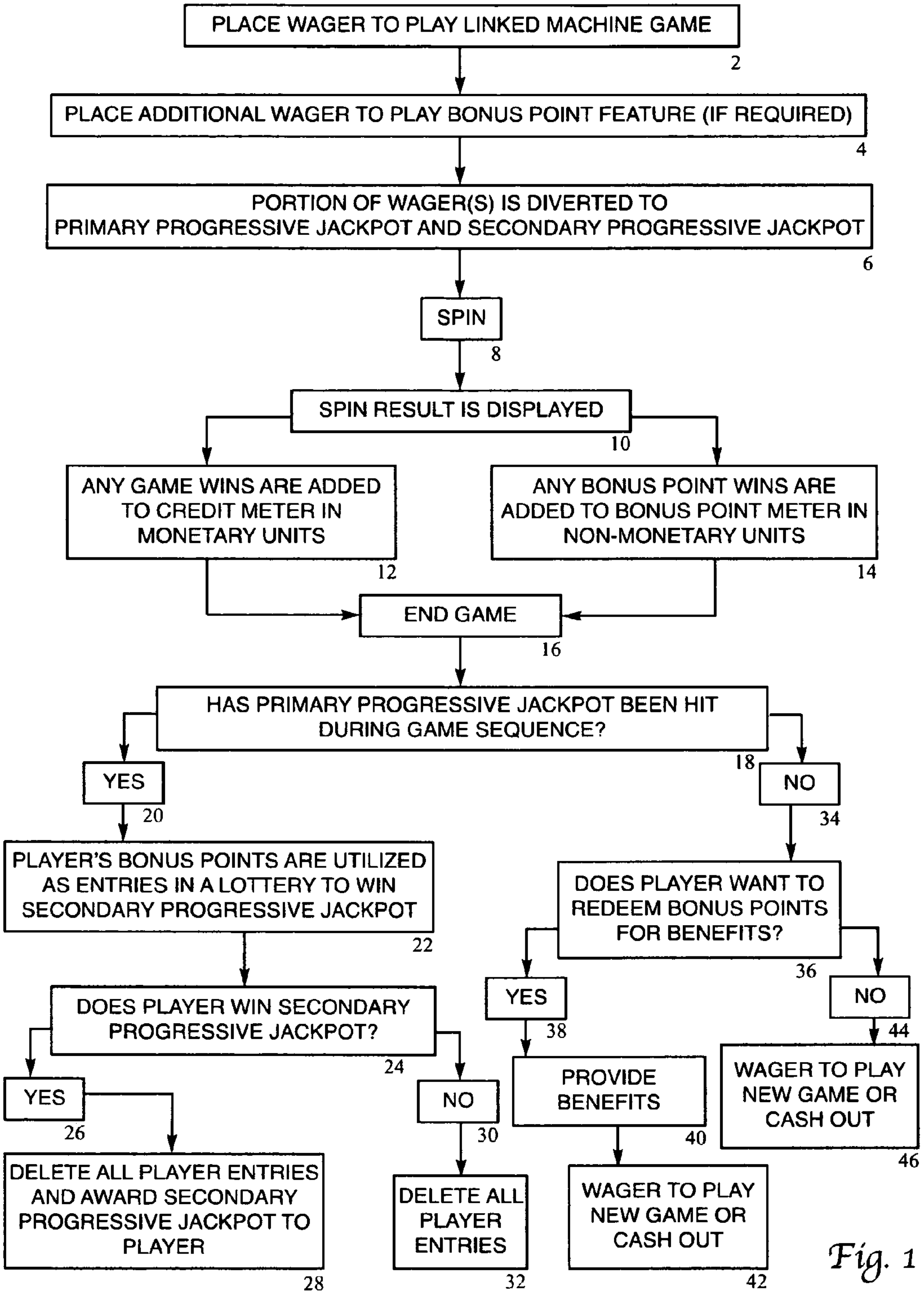
FIG. 1 shows a flow chart of a first embodiment of the present invention.

Electromechanical reels or a video monitor screen controlled by a processor is provided on which symbols may be provided for use in a slot or video poker machine game. The symbols may be positioned in a grid, preferably as a matrix of rows and columns, or may be positioned in other symmetric, asymmetric or random patterns or shapes. Individual slot machines utilizing the present invention may be or are linked together in a network, for example within a single casino, among a chain of casinos, within a particular gaming district, intrastate or interstate.

A method of game play is described for use in a gaming system using a processor to store credits. The method comprises:

a player placing an at least first wager to play in an underlying game in which symbols are provided to players making the at least first wager;

each player receiving a set of symbols in a round of play;

each set of symbols for each player is evaluated according to a first paytable and a first determination is made as to whether the set of symbols is a winning or losing event, and the first wager is resolved on a cash or credit basis based on the first determination;

each set of symbols is then evaluated according to a second paytable and a second determination is made as to whether the set of symbols is a winning or losing event, and the first wager or a second wager is resolved on a non-cash or non-credit basis based on the second determination; and cash and credit balances are maintained by the processor in a first account and non-cash and non-credit balances from the second determination are maintained in a separate account distinct from the first account; and non-cash and non-credit balances are either redeemable by each player for benefits or saved as potential entries in a progressive jackpot-related event.

The first paytable may be preferably designed so that it does not include every winning event in the second paytable or that it does not include more than three winning events in the second paytable and the second paytable identifies at least four winning events. Alternately and/or additionally, the winning symbol combinations in the first paytable may preferably be determined on a different basis from the winning symbol combinations in the second paytable. One way of enabling this may include where the symbols are read in determining outcomes in the first paytable from left-to-right or right-to-left on the symbol display and the symbols are read in determining outcomes in the second paytable from right-to-left or left-to-right, respectively on the symbol display. The non-cash and non-credit points may be used to enter a jackpot-related or progressive jackpot-related event or even only non-cash and non-credit points may be used to enter a jackpot-related or progressive jackpot-related event.

The method may be performed wherein portions of wagers by the player are used to increment a progressive jackpot event and non-cash and non-credit points may be used to enter a progressive jackpot-related event or wherein portions of wagers by the player are used to increment a progressive jackpot event and only non-cash and non-credit points may be used to enter a progressive jackpot-related event.

The player makes a wager to play an underlying base game against a paytable and an additional bet (an optional or mandatory bet) or side bet may be required to qualify for participation in a bonus point feature, the said side bet preferably being required to be made before any symbols are spun. Upon wagering and initiating the base game to play, an intermediate or final display of symbols is shown. The term intermediate display is meant to include games in which there may be replacement spins, discards and draws, or secondary steps in the game in which additional or replacement symbols may be available. The eventual resultant final symbol display is then analyzed by the machine processor, and any winning symbol combinations are awarded in monetary units, free spins, value or credits to the individual player's credit account and shown on a corresponding credit meter according to a first predetermined paytable. The player may use these said monies or credits for any purpose, usually to play additional games or to cash out for pay redemption. The resultant final symbol display is also reanalyzed (before, simultaneously or after analysis under the first paytable) for, preferably, at least some distinctly different and separate winning symbol combinations or at least some winning symbol combinations are determined on a distinctly different basis from the first analysis, which are paid according to a second predetermined paytable and awarded in non-monetary bonus points. The non-monetary bonus points are deposited into a separate bonus point account and shown on a corresponding bonus point meter on the machine, and are preferably linked to the specific player, although alternately they may be linked to the particular machine. Non-monetary bonus points are separate and distinct from a player's monetary units or credits. Unlike monies or credits that may be used to wager on games, non-monetary bonus points may not be immediately used directly as wagering credits or monies, and may instead be either redeemed for value or benefits or saved as potential entries in a progressive prize-related event. Bonus points may accumulate from game to game, or session to session, and may increment until the player chooses to utilize them. The point system feature allows the player the flexibility to choose to either redeem the accumulated points for value or benefits (i.e., cash, credits, casino player points, free spins, enhanced gameplay, enhanced paytables and the like) or save the points as potential entries into a progressive prize-related lottery. In converting bonus points to credits or cash, the system may restrict conversion times and conversion rates so that non-monetary bonus points would not be linearly converted from points to credits on a one-to-one basis or may restrict the use of bonus points during that play session to be converted to credits to play the underlying first game event. The system may allow ticket output of credits or cash conversions from the non-monetary points according to a conversion system at any time during or after play.

In a preferred embodiment of the present invention, an electromechanical or video slot game is discussed, although any other game of chance (cards, bingo, dice, etc.) may be utilized. Individual gaming machines and even playing card tables with electronic input of data are linked together electronically in a network, and at least one progressive jackpot prize may be offered. The individual machine base game preferably consists of at least two sets of symbols, such as rows and columns of frames or symbols, such as at least two parallel reels or reel areas, the reels providing individual symbol areas. Predetermined paylines that intersect the symbol areas in the base game and scatter pay symbols are available for wagering. Preferably, the base game is a video depiction of a 5-reel×3-row arrangement of 15 symbols, and at least 9 paylines are offered. The player chooses the number of paylines upon which to wager, and the number of credits to be wagered on each payline. The total wager (number of paylines times number of credits per payline) may then be augmented by an additional side bet wager. The side bet provides the player with the opportunity to engage in a non-monetary bonus point feature. A portion of the total wager and/or a portion of the side bet may be utilized to fund the at least one progressive jackpot prize.

Upon making the game wager and the side bet, the machine is activated to display an initial array of symbols. This resultant array of symbols of the activation or supplemented, augmented or altered set of symbols that forms a final set of symbols is first analyzed for winning symbol combinations according to a first predetermined paytable. Preferably the winning symbol combinations in the first paytable are based on a left-to-right reading of the symbols along designated paylines or on the basis of any reading schedule for paylines defined in the game, including reading of non-adjacent symbols, non-linear arrangements, scatter arrangements and the like. Winning symbol combinations according to the first paytable are paid to the player in monetary units or credits, which may be added to the player's credit account and displayed on a corresponding credit meter, and which may be used to play additional games or to cash out for monetary units. The final set or resultant array of symbols of the activation is additionally analyzed for winning symbol combinations according to a second predetermined paytable. Preferably the winning symbol combinations in the second paytable are based on a right-to-left reading of the symbols along designated paylines, although alternate methods such as special bonus point symbols or random bonus point events, or different winning symbol combinations may be utilized to provide bonus points. For example, in old standard slot machine symbols, lemons were seldom part of a positive event in play. In the present system, the first reading may exclude three adjacent lemons as a paytable event, but the second paytable may include three consecutive lemons on a payline as a winning event. Winning symbol combinations according to the second paytable are paid to the player in non-monetary units or bonus points, which may be added to the player's separate bonus point account and displayed on a corresponding bonus point meter, and which may not be used directly to play additional games or to cash out for monetary units, especially not as one-to-one conversions of points to cash or credit. Non-monetary bonus points are kept separate and distinct from a player's monetary units or credits. Unlike monies or credits that may be used to wager on games, bonus points should not or may not be used directly as wagering credits or monies for direct use in the play of the underlying game during that game play session, and may instead be either redeemed for value or benefits or saved as potential entries in a progressive game-related event. Bonus points may accumulate from game to game and/or session to session, and may increment until the player chooses to utilize them. The point system feature allows the player the flexibility to choose to either eventually redeem the points for value or benefits (i.e., cash, credits, casino player points, free spins, and the like) or save the points as potential entries into a progressive prize-related lottery.

The redemption of bonus points is a player decision, and may preferably be performed after a first base game has been completed, and before a second game has been initiated. According to predetermined rules of the present invention, a player may decide to redeem any or all of the bonus points in his separate bonus point account for specific benefits. The benefits may include, as exemplary but not limited options, cash, credits, free spins, multipliers, enhanced gameplay, enhanced paytables, player comps and casino player points. Predetermined redemption rules may allow the player to exchange the points at a specified fractional value (e.g., 10 points for 1 credit, or 10:1, for example) for monetary units or credits that can be added to the player's credit account, local account or cashed out. For example, a player may have 400 bonus points in his bonus point account, and may choose to redeem 200 of said points. If the predetermined game rules allow for an exchange rate of 20:1, the player would receive $10.00 or 10 credits on a $1.00 machine, and 200 bonus points would be eliminated from his bonus point account. In a separate example, game rules may allow the player to redeem bonus points for free spins. Free spins may cost X amount of points per free spin (e.g., 25 points for 1 free spin at a fixed basis wager amount), and the free spin(s) may be used immediately or held in reserve to be used at a later time or transferred to another players wagering account (e.g., if a husband wanted to transfer funds to his wife to enable her to continue play at another machine). Alternately, a fixed amount of bonus points may be required to receive a random number of free spins. Another example might be where the points can be used to change paytables for another game event. In that example, 200 points might be used to change odds in paytables used in the play of a next game, as by increasing payouts on poker hands as follows:

| Normal Payment | | Enhanced payment Purchased by Points | |
|---|---|---|---|
| Royal Flush | 4000:1 | Royal Flush | 6000:1 |
| Straight Flush | 250:1 | Straight Flush | 500:1 |
| Four-of-a-Kind | 125:1 | Four-of-a-Kind | 250:1 |
| Full House | 25:1 | Full House | 50:1 |

and the like. In this way, the player can use the point credits with an anticipation of higher awards on specific spin or game events at the player's discretion.

To illustrate another possible embodiment of this invention by this example, bonus points may be redeemed for specific or random multipliers, to be used in the next base game or to be held in reserve to be used at a later time. For example, a player may redeem 20 points to receive a 2× multiplier, 30 points for a 3× multiplier, 40 points for a 4× multiplier against some or any events in the play of the game, including only on point events, and so on. Multipliers may be used to enhance winning credit payouts, bonus point payouts, or combinations thereof in subsequent gameplay. For instance, the redemption of 30 bonus points for a 3× multiplier would allow any credit wins in a specific subsequent game to be tripled when the 3× multiplier is used in that specific subsequent game. Single multipliers may or may not be used in conjunction with other multipliers. Alternately, the player may redeem a fixed amount (e.g., 100 bonus points) to receive at least one random multiplier (e.g., randomly either a 3×, 5×, 10× or 25× multiplier, for example) against some or any events in the play of the game, including only on point events, and so on. In further illustration, the player may redeem 200 points for a random amount of multipliers (e.g., at least two random multipliers) and subsequently randomly receive three multipliers (i.e., 2×, 5×, and 10×). According to specific rules of the game, the player may or may not utilize multiple multipliers in one base game (i.e., the player may use only one multiplier per game, or may be able to use up to all in one game [e.g., using 2× and 5× and 10× would in effect give the player a 100× multiplier]).

To illustrate yet another possible embodiment of this invention by this example is to have the possibility of a wild card or wild symbol being added to the underlying game for a specific spin. For example, in a game where there are already wild symbols or in which there are not wild symbols, the player may spend X points to have a wild symbol added to the mapping of one or more reels in the next spin. In yet an alternate method of point redemption, casino player club points may be exchanged for bonus points at a specific rate of X bonus points for each player club points. For example, 50 bonus points may be redeemed for 1 player club point.

In lieu of redeeming bonus points, the player may instead choose to save the points in his bonus point account to be utilized as entries into a progressive prize-related event. As previously disclosed above, the present invention preferably utilizes linked gaming machines in a network, and a progressive jackpot game is offered. Upon a specific triggering event in the base game, the progressive jackpot is won by the player who receives the triggering event. A secondary event is then automatically provided for all players, preferably including the jackpot-winning player, who have bonus points available on their bonus point meter and are willing to expend bonus points to play the game. A fixed number of bonus points may be automatically withdrawn and the player entered into the progressive jackpot-related event when the occasion arises. Examples of these said secondary events may include, but are not limited to:

a) A secondary progressive jackpot scheme. In addition to the primary progressive jackpot that is initially seeded at a specific predetermined amount ($5,000.00, for instance), a preferably less valuable progressive is provided (initially seeded at $500.00, for instance). Both jackpots increment until the primary jackpot is won. Upon a player winning the primary jackpot, all players' total amount of bonus points (or alternately an amount of bonus points, from none to all, as specified by each individual player) are deposited as entries into a lottery-type drawing, each entry being linked to the particular player or machine from whose bank account the entry was withdrawn. Upon a random number generation event, one entry is drawn, and the player or machine linked to that entry is awarded the secondary jackpot. (An alternate method would allow for multiple entries to be drawn, with the winning players either sharing the secondary jackpot or each being awarded the secondary jackpot.) Preferably all winning and non-winning entries are discarded and withdrawn from any further play or value or benefits.

b) A winner-takes-all bonus point scheme. Upon a player winning the primary progressive jackpot, all players' total amount of bonus points (or alternately an amount of bonus points, from none to all, as specified by each individual player) are deposited as entries into a lottery-type drawing, each entry being linked to the particular player or machine from whose bank account the entry was withdrawn. Upon a random number generation event, preferably one entry is drawn, and the player or machine linked to that entry is awarded the total amount of bonus points that were entered in the drawing.

c) A random multiplier opportunity. Players receive one entry for each bonus point in their bonus point account, each entry being linked to the particular player or machine from whose bonus point account the entry was withdrawn. Preferably, the player retains the bonus points in his bonus point account, and the bonus points are not eliminated. Alternately, a player may specify an amount of bonus points to be converted to entries, the entries being deleted after the random multiplier opportunity is completed, and the remaining bonus points in the player's bonus point account would be eligible for multiplying. Upon a player winning the primary jackpot, a random multiplier ranging from a minimum of 1× to a predetermined maximum (10×, for example) is displayed on the monitor screen of each player whose account contains at least one bonus point and therefore at least one entry. Preferably, the machine processor determines any particular multiplier by randomly first selecting at least one entry from the total entry pool (a specified amount, predetermined amount, or a percentage of entries may be selected, for instance) as the recipient(s) of the highest multiplier. Preferably a selected entry is then removed from the entry pool. A second random selection of at least one entry provides the second-highest multiplier to the recipient(s). Additional selections are processed in the same manner, until the lowest predetermined multiplier (i.e., 1× or 2×) has been selected and distributed to the recipient(s). The bonus point total in each player's bonus point account is then multiplied by the particular multiplier received on the player's monitor screen. For example, one player may have 100 bonus points in his bonus point account when the progressive jackpot is won. He receives a random multiplier of 2× on his monitor screen, and the total in his bank account is now 200 points. Another player may initially have 250 points, and after receiving a random multiplier of 5×, his bank account would now total 1250 points. It is contemplated that a player may receive more than one multiplier, in which case the multipliers may be either added or multiplied (for instance, if a player receives a 2× multiplier and 3× multiplier, the final multiplier may be 5× or 6×).

Reference to the Figures will assist in further understanding of the practice of the present invention.

FIG. 1 shows a flowchart depicting a preferred methodology of the present invention. An initial wager is placed to play the base symbol game on a network-linked machine 2, and an additional wager may be required to be eligible for the bonus point feature 4. A portion of the initial wager, and possibly the additional wager, is preferably diverted to a primary progressive jackpot and a secondary progressive jackpot 6. The machine is activated to spin the symbol reels 8, and a final symbol display 10 is shown. The result is analyzed for primary game wins that are paid in monetary units or credits to the credit meter 12. The result is further analyzed for bonus feature wins that are paid in non-monetary units or points to the bonus point meter 14. The game is then over 16, and a determination is made as to whether or not the primary progressive jackpot has been hit during the game sequence 18. If so 20, some or all of each player's bonus points are converted into player-related or machine-related entries in a lottery pool 22. A random selection of at least one entry is performed by the machine processor 24, with the selected entry or entries 26 qualifying that related player to be awarded the secondary progressive jackpot 28. All winning and non-winning 30 entries are then deleted, in effect deleting those bonus points 32. If the primary progressive jackpot has not been hit 34, the player is given the opportunity to redeem any bonus points in his bank account for specific benefits 36 such as free spins or cash. If the player chooses to redeem bonus points 38, the player is awarded the benefits 40, and may then choose to either play a next game, or cash out 42. If the player does not choose to redeem bonus points 44, he may then choose to either play a next game, or cash out 46.

Figure 2:
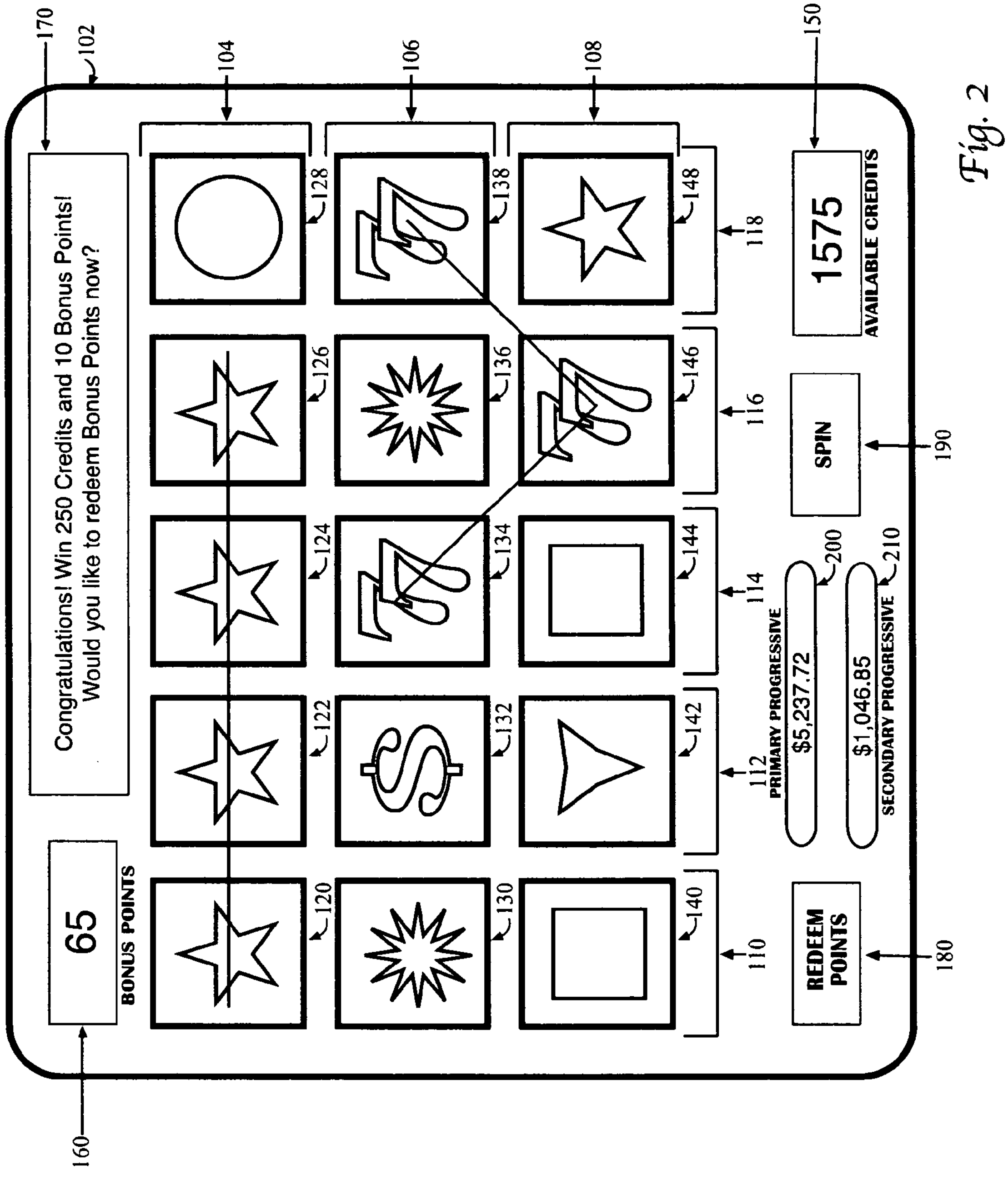
FIG. 2 shows a monitor screen of a slot machine with the results of a wagered spin according to the teachings in FIG. 1.

FIG. 2 illustrates the methodology in FIG. 1, and shows a slot machine monitor screen 102 with the result of the completed spin after the player has wagered to play the base game. Fifteen individual symbol boxes (120, 122, 124, 126, 128, 130, 132, 134, 136, 138, 140, 142, 144, 146, 148) are arranged in a three-row (104, 106, 108) by five-column (110, 112, 114, 116, 118) matrix. A message box 170 indicates to the player that this spin result consists of one 250-credit win for the left-to-right symbol combination of Star 120, Star 122, Star 124, and Star 126 as well as a 10-point win for the right-to-left symbol combination of Sevens 138, Sevens 146, and Sevens 134. A credit meter 150 is shown, displaying the number of available credits after the win is added. A bonus point meter 160 is also shown, displaying the number of bonus points after the win is added. The message box 170 additionally notifies the player of the opportunity to redeem points, which may be executed by pressing the Redeem Points button 180, or negated by pressing the Spin button 190 to play a next game. A primary progressive jackpot meter 200 is shown, as well as a secondary progressive jackpot meter 210.

Figure 3:
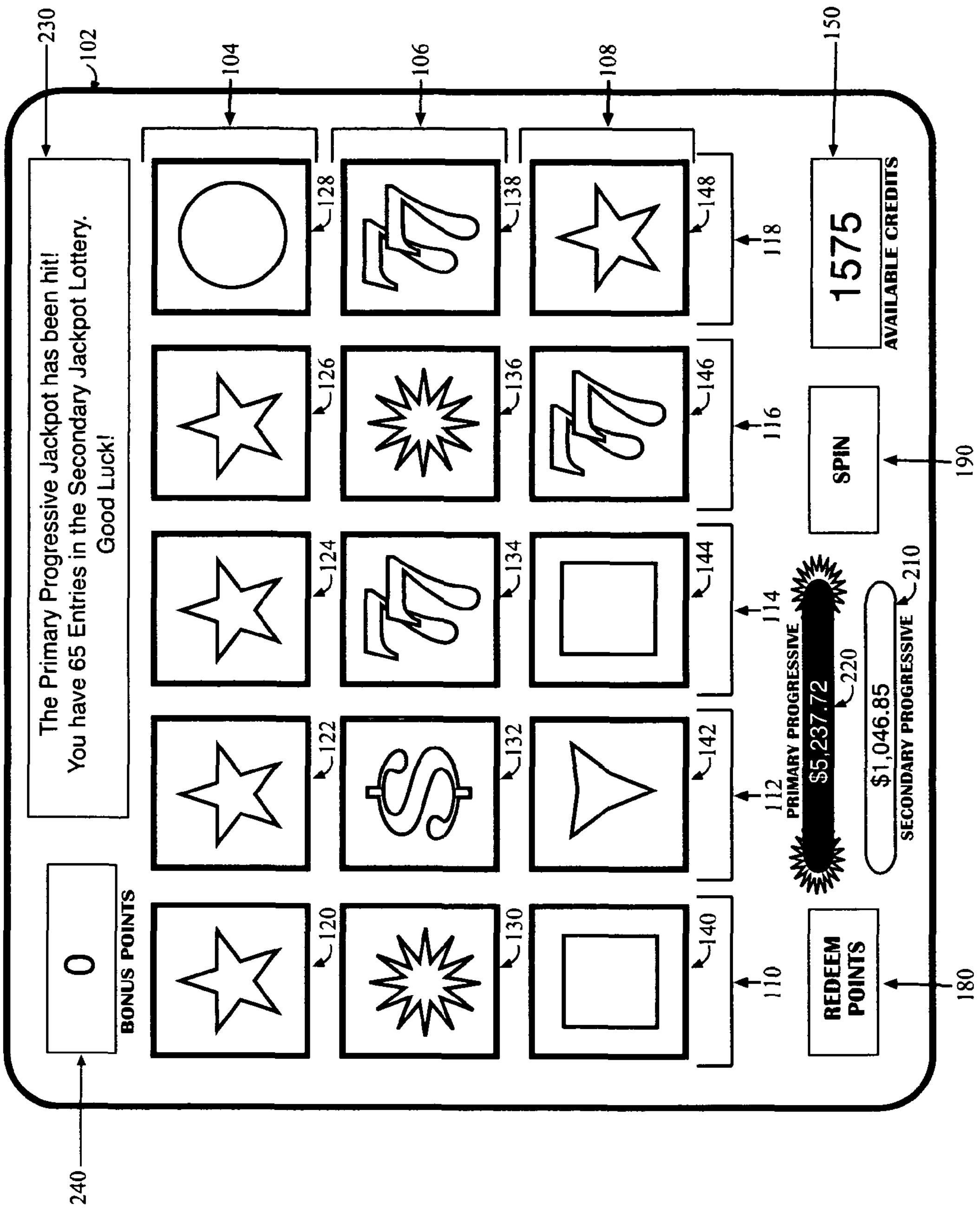
FIG. 3 shows the same game at a later stage.

FIG. 3 refers to the game elements shown in FIG. 2 with the primary progressive jackpot being highlighted 220 to indicate that it has been won by one player on the network. (If the primary progressive had not been hit, the player would then have the opportunity to redeem credits.) The message box 230 now displays a message that the primary progressive jackpot has been hit and that the player's 65 bonus points have been converted into entries for the secondary jackpot. The player's bonus point account now is at zero 240.

Figure 4:
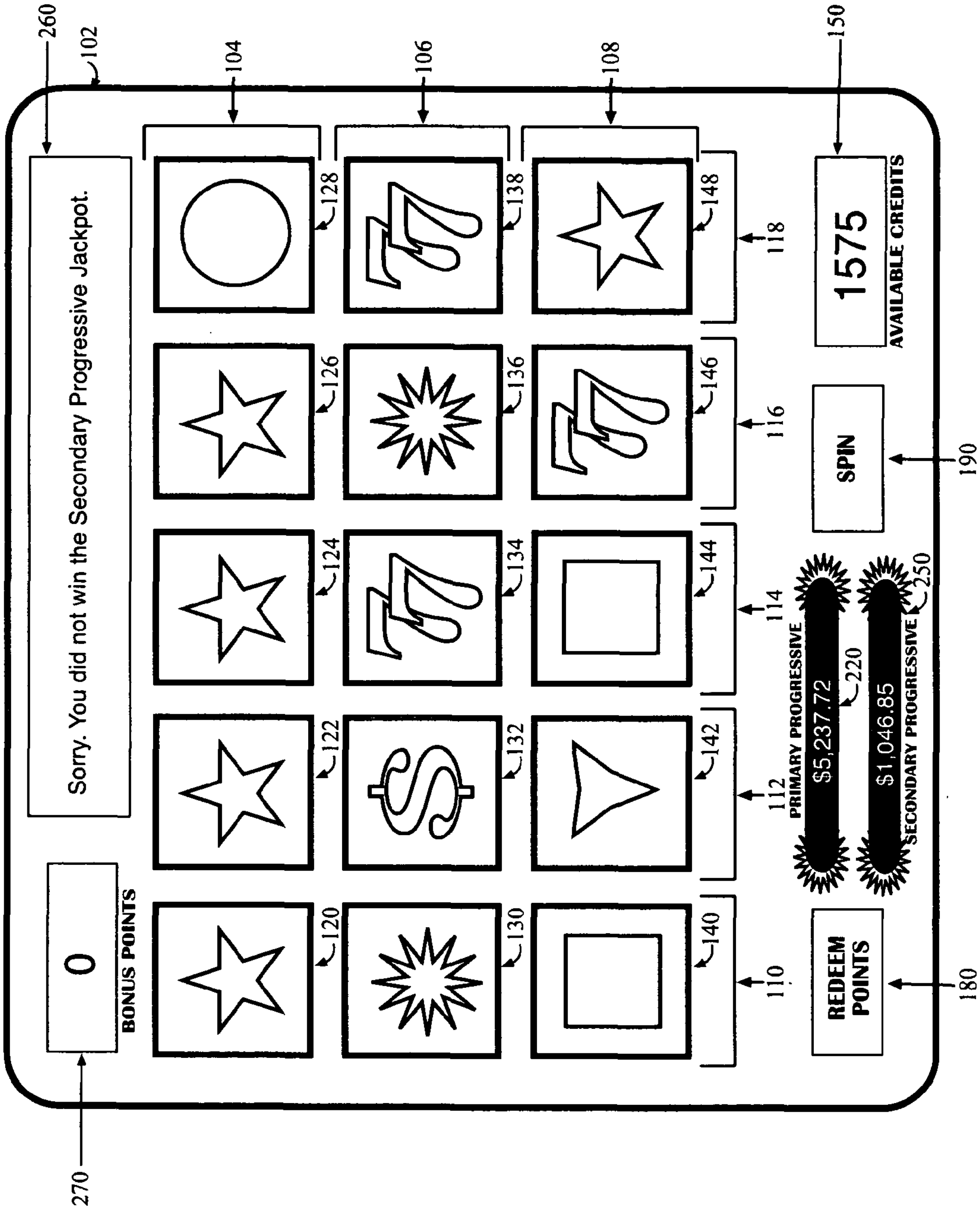
FIG. 4 shows the same game at a final stage.

FIG. 4 refers to the game elements shown in FIG. 3 with the secondary progressive jackpot lottery completed and the result shown by the highlighted secondary progressive meter 250. The message box 260 now displays a message that the player did not win the secondary progressive jackpot. The player's bonus point account remains at zero 270.

Figure 5:
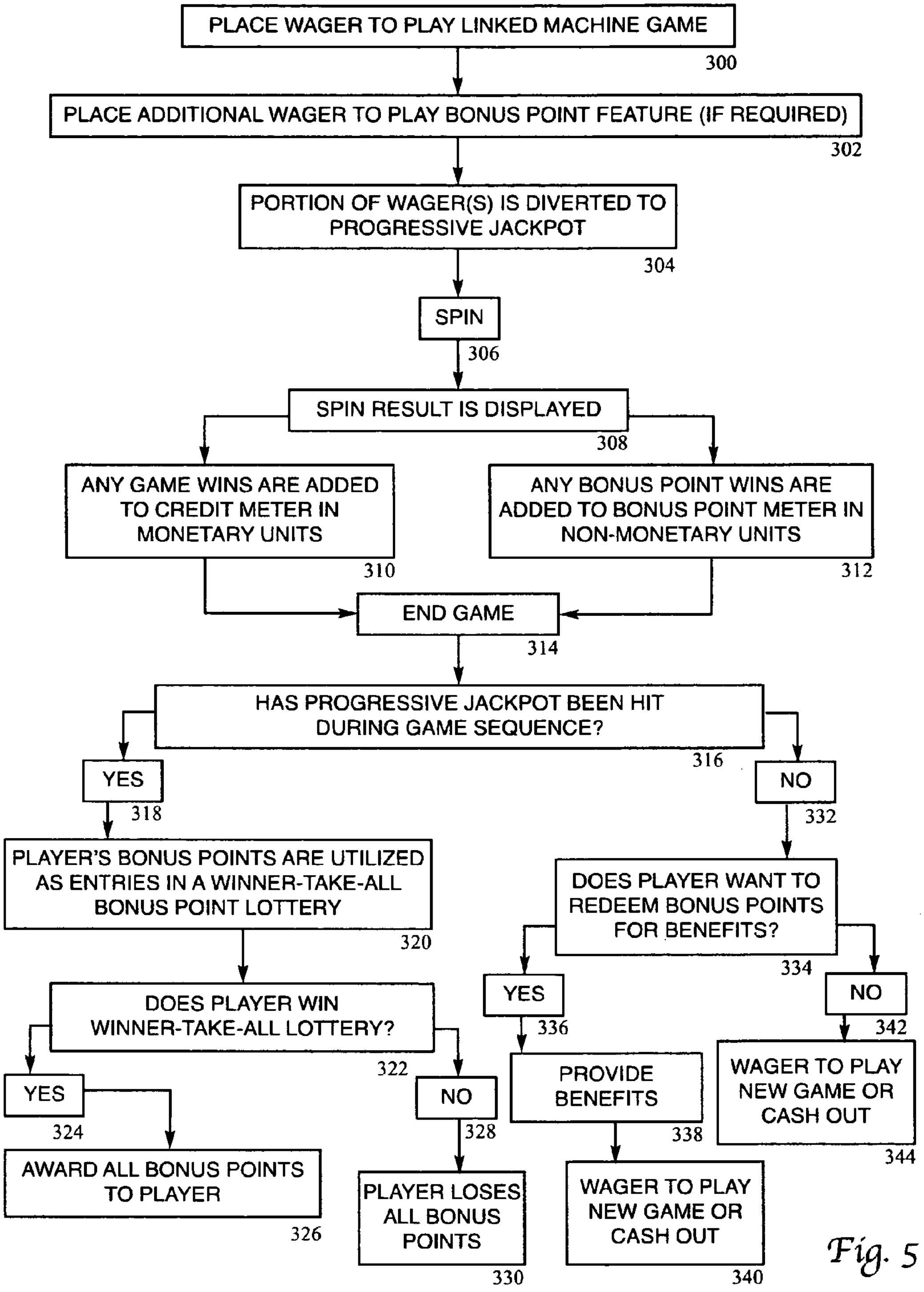
FIG. 5 shows a flow chart of a second embodiment of the present invention.

FIG. 5 shows a flowchart depicting a second preferred methodology of the present invention. An initial wager is placed to play the base symbol game on a network-linked machine 300, and an additional wager may be required to be eligible for the bonus point feature 302. A portion of the initial wager, and possibly the additional wager, is preferably diverted to a progressive jackpot 304. The machine is activated to spin the symbol reels 306, and a final symbol display 308 is shown. The result is analyzed for primary game wins that are paid in monetary units or credits to the credit meter 310. The result is further analyzed for bonus feature wins that are paid in non-monetary units or points to the bonus point meter 312. The game is then over 314, and a determination is made as to whether or not the progressive jackpot has been hit during the game sequence 316. If so 318, some or all of each player's bonus points are converted into player-related or machine-related entries in a lottery pool 320. A random selection of at least one entry is performed by the machine processor, with the selected entry 322 qualifying that related player to be awarded the winner-take-all bonus point lottery 324. The total of all entries are converted back to bonus points that are then awarded to the winning player 326. If the primary progressive jackpot has not been hit 332, the player is given the opportunity to redeem any bonus points in his bonus point account for specific benefits 334 such as free spins or cash. If the player chooses to redeem bonus points 336, the player is awarded the benefits 338, and may then choose to either play a next game, or cash out 340. If the player does not choose to redeem bonus points 342, he may then choose to either play a next game, or cash out 344.

Figure 6:
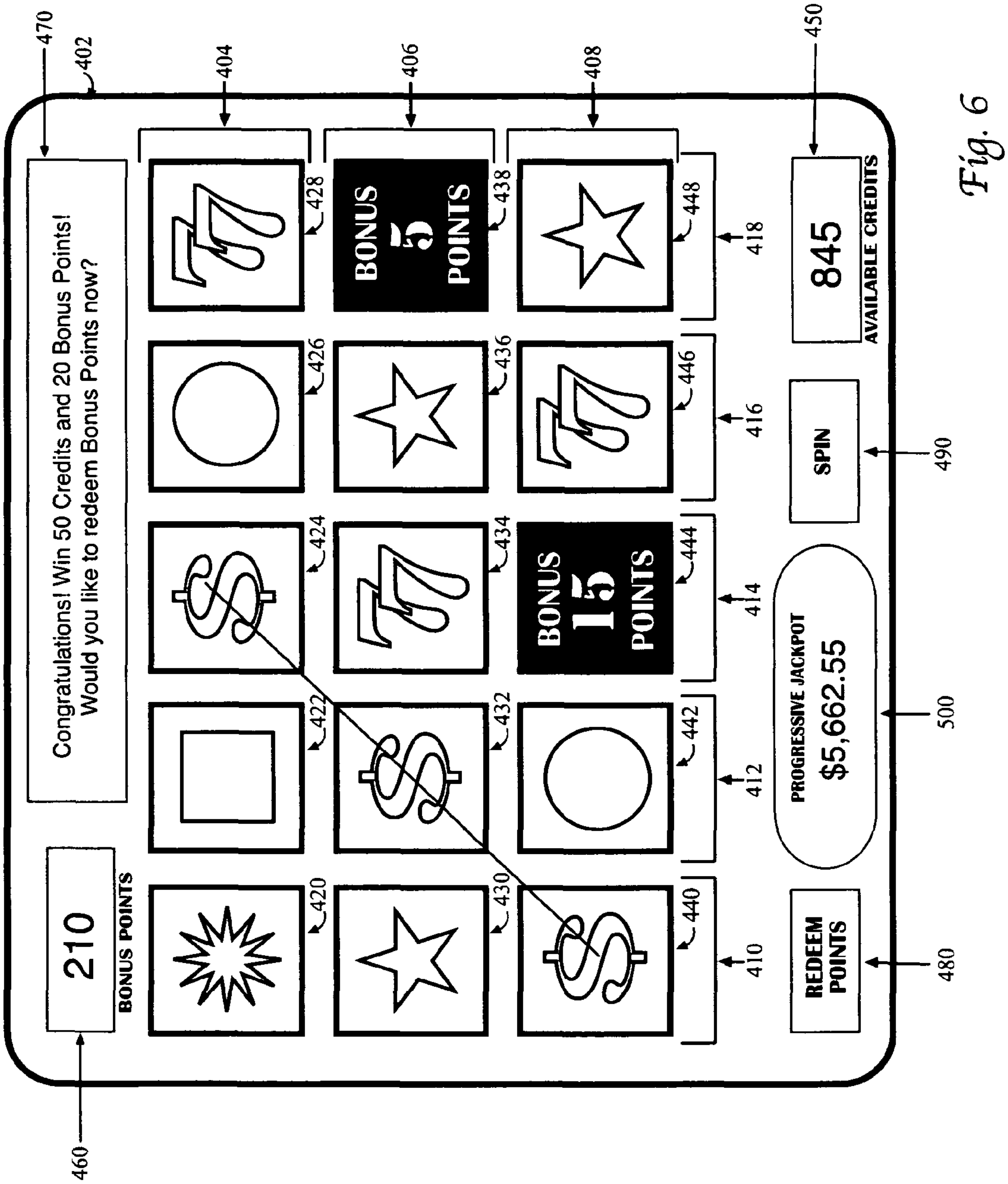
FIG. 6 shows a monitor screen of a slot machine with the results of a wagered spin according to the teachings in FIG. 5.

FIG. 6 illustrates the methodology in FIG. 5, and shows a slot machine monitor screen 402 with the result of the completed spin after the player has wagered to play the base game. Fifteen individual symbol boxes (420, 422, 424, 426, 428, 430, 432, 434, 436, 438, 440, 442, 444, 446, 448) are arranged in a three-row (404, 406, 408) by five-column (410, 412, 414, 416, 418) matrix. A message box 470 indicates to the player that this spin result consists of one 50-credit win for the left-to-right symbol combination of Dollar Sign 440, Dollar Sign 432, and Dollar Sign 424, as well as a 20-point win for the two random scatter Bonus Point symbols (444, 438). A credit meter 450 is shown, displaying the number of available credits after the win is added. A bonus point meter 460 is also shown, displaying the number of bonus points after the win is added. The message box 470 additionally notifies the player of the opportunity to redeem points, which may be executed by pressing the Redeem Points button 480, or negated by pressing the Spin button 490 to play a next game. A progressive jackpot meter 500 is shown.

Figure 7:
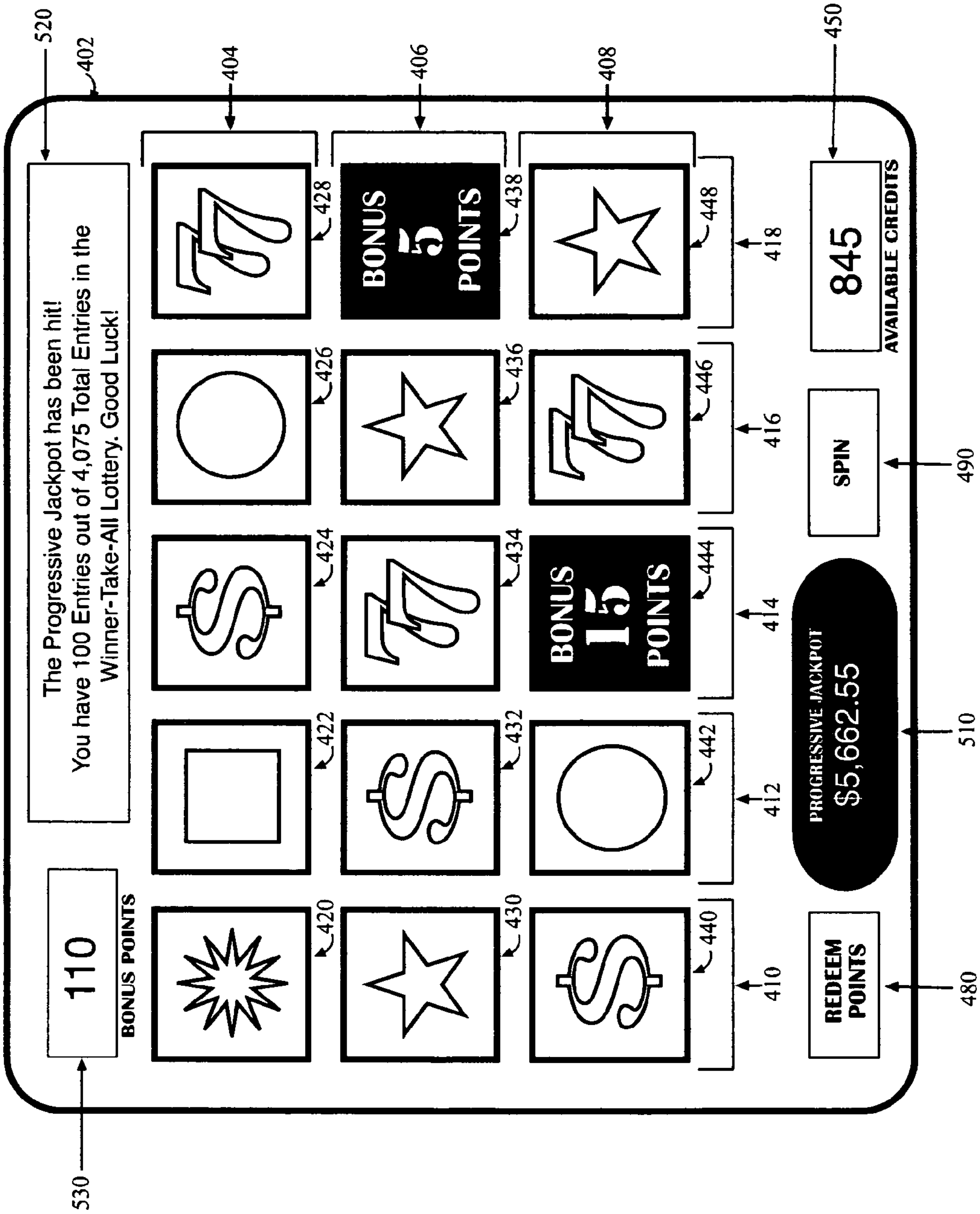
FIG. 7 shows the same game at a later stage.

FIG. 7 refers to the game elements shown in FIG. 6 with the progressive jackpot being highlighted 510 to indicate that it has been won by one player on the network. The message box 520 now displays a message that the progressive jackpot has been hit and that the player has chosen to convert 100 of his 210 bonus points as entries into a Winner-Take-All Lottery. The player's bonus point account now is at 110 bonus points 530.

Figure 8:
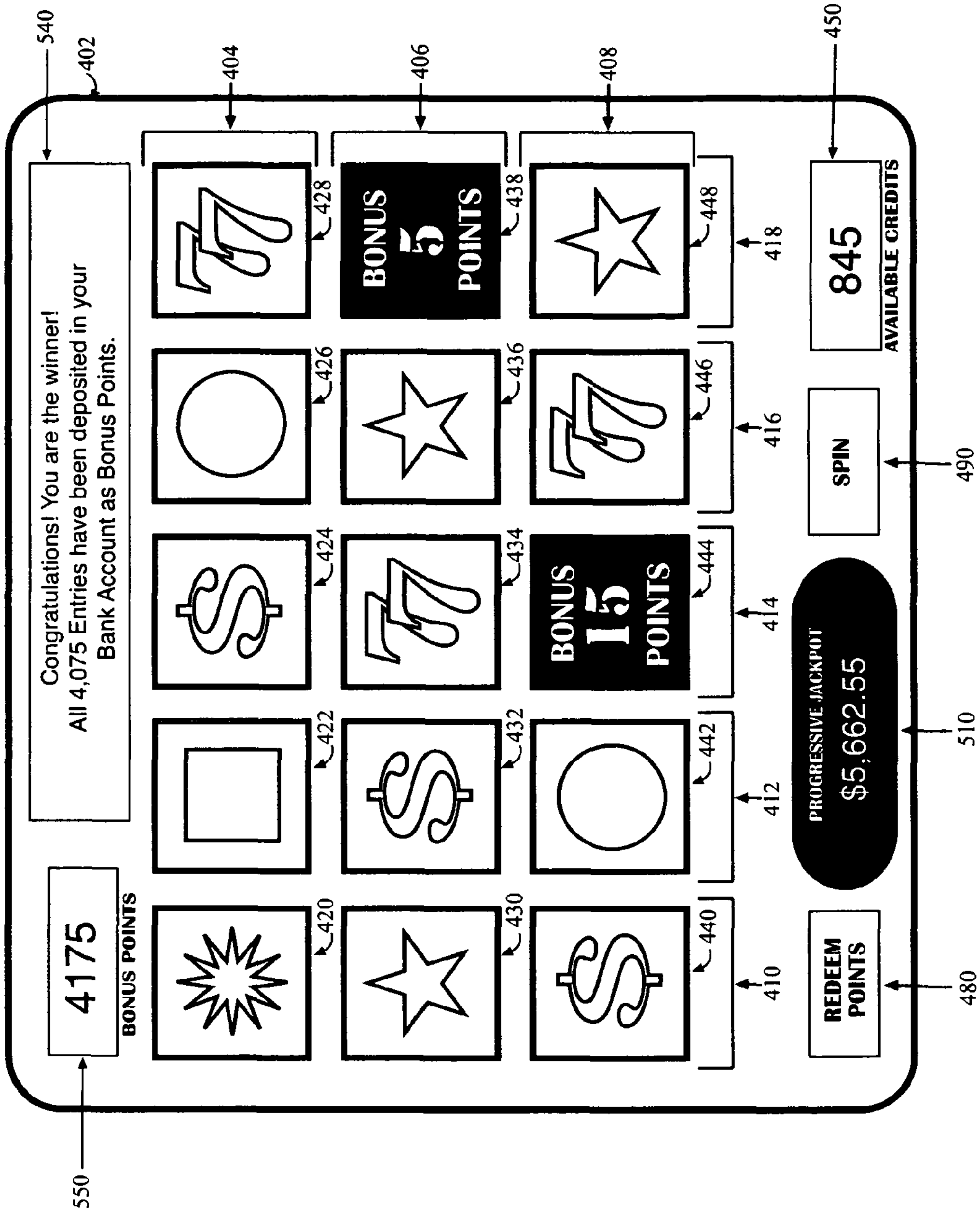
FIG. 8 shows the same game at a final stage.

FIG. 8 refers to the game elements shown in FIG. 7 with the Winner-Take-All Lottery having been completed. The message box 540 now displays a message that the player did win the Winner-Take-All Lottery, winning the total of the 4,075 entries in the Lottery. The entries are converted back into bonus points, and added to the player's bonus point account that now stands at 4,175 bonus points 550.

FIG. 9 is a sample Point Redemption Chart 600 that shows several different player-selectable benefits and the corresponding number of bonus points needed for each benefit. Preferably the chart is displayed on the monitor screen, and the player may select his choice of benefits by using a touch-screen technology.

The present invention can be implemented using a variety of different apparatus. Preferably, the invention is implemented using a computer to determine game operations. A typical computer includes a central processing unit connected to a memory. The computer has connected thereto other devices such as display screen, buttons and/or a touch screen input device, one or more front panel buttons used in the operation of the machine; a coin, credit, token, or card acceptor for allowing a player to place bets; a network card for connecting the computer to an optional central computer, and security system connections. The central computer may be used for accounting, bookkeeping, and/or security purposes, or for downloading new game software or game software upgrades to computer, and/or for controlling the operation of the game via a network. In one optional embodiment, the computer includes a memory having a more permanent first portion in which is stored the software for running games on a CPU. This more permanent memory may be a hard disk read only memory (ROM), erasable programmable read only memory (EPROM), an application specific integrated circuit (ASIC), field programmable gated array (FPGA) or even a feed through a network to a localized or central memory. A thin client network from the central computer or local game computer to the individual gaming device may alternatively be provided. All of these integrated circuit storage means are well known in the art so are not discussed further. The advantage to providing all game logic via a stored program on hard disk, or via network card from a central computer is that a game may quickly and easily be updated, or a different game program be loaded to run on the computer without having to change any integrated circuit chips, such as the ROMs, EPROMs or ASICs. When game software remains on the central computer, it permits games to be played over a local network, or over a remote network which may include the Internet. The network may be hard wired or wireless. The memory also has a second portion used in playing the games. The second memory would be typically a random access memory (RAM) with memory locations associated with each of the primary game positions, secondary game positions, secondary game progressives, information display areas and soft buttons on a display.

These memory locations store information about the game symbols displayed, the bets placed, winnings, the speed of the game, etceteras. Alternatively, individual game software may not be permanently stored in memory. When a player touches a game selection button, or reel set selection button or control, and a game or reel sets is selected for a game, the request may be transmitted via network or network card to a central computer and the game software is downloaded to the more permanent memory to be used by the CPU to run the game or reel set chosen by the player. This permits central control of the games to be played on specific machines, fast upgrades of game software and easier addition of software for new games. Hardware systems and components such as those disclosed in U.S. Pat. No. 5,908,354 (Okuniewicz) and U.S. Pat. No. 5,772,509 (Weiss) may also be used to support the technology originally described herein.

Hardware Considerations

1. A display controller may be used to create a 3d graphical representation of chips stacked as they would be on a live table.
2. An intelligent sound system can be used to interface with the game controller and display controller to play different sounds and sound volumes depending on what stage and state of play the game is in. Includes speakers and a sub-woofer in the table to vibrate the table and give it feel at certain points in the game.
3. Moderate size such as 10 inch" (25.4 cm) touch screens may be connected to the system with a layout of the game for the players to interact with the game.
4. Serial Card reader can be provided for players to insert rating cards which are logged in the Rapid Database.
5. Server PC with SQL database can be provided.
6. BOH PC with Reporting and configuration utility can be provided.
7. A relatively larger 26 inch (65 cm) LCD screen or other monitor can be used for Display or results, histories, and other information.

Software Consideration

1. SQL Database for holding game configuration and game data and player ratings can be provided into the system.
2. Table Configuration software to configure odds, table layout, betting positions, commission value, table maxim and bet position maximum and minimum as well as chip values should be provided in the system.
3. Reporting software, for reporting to central auditing, record keeping, player comping, central finance area can and should be provided.
4. SGC software to allow the dealer to start the game, enter the result, confirm the result, open/close the table, buy in players, cash out players and disable/enable player terminals should be provided in the system.
5. Terminal Software to show the table layout on the 10 inch (25.4 cm) LCD Touch screens and allow the player to interact with the game are preferred, although table menu prints of wagers are acceptable.

6. Game Controller software to catch or read bet positions and values from player terminals as they are received by the SGC and send them to the display controller in real time.
7. Display software may be provided on the display controller PC with the capability on showing the game play in real time on a 3d representation of the game table along with a number tree of previous results of individual throwers and animation of dice, table open and closed.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Although specific examples and specific images have been provided in this discussion, these specifics are intended to be only support for the generic concepts of the invention and are not intended to be absolute limits in the scope of the technology discussed.

What is claimed:

1. A method of game play on a gaming system using a processor to store credits, a player input, and a symbol display screen, the method comprising:

a player placing an at least first wager using the player input to play in an underlying game on the gaming system in which symbols are provided on the symbol display screen to players making the at least first wager;

each player receiving a set of symbols from the processor and on the symbol display screen in a round of play;

each set of symbols for each player is evaluated by the processor according to a first paytable and a first determination is made by the processor as to whether the set of symbols is a winning or losing event, and the first wager is resolved by the processor on a cash or credit basis based on the first determination;

each set of symbols on the symbol display screen is then evaluated by the processor according to a second paytable and a second determination is made by the processor as to whether the set of symbols is a winning or losing event, and the first wager or a second wager is resolved by the processor on a non-cash or non-credit point basis based on the second determination; and cash and credit point balances are maintained by the processor in a first account and non-cash and non-credit balances from the second determination are maintained by the processor in a separate account distinct from the first account.

2. The method of claim 1 wherein the first determination is made by the processor on a different basis from the second determination made by the processor.

3. The method of claim 1 wherein the first paytable does not include every winning event in the second paytable.

4. The method of claim 1 wherein the first paytable does not include more than three winning events in the second paytable and the second paytable identifies at least four winning events.

5. The method of claim 2 wherein the symbols are read by the processor in determining outcomes in the first paytable from left-to-right or right-to-left on the symbol display and the symbols are read by the processor in determining outcomes in the second paytable from right-to-left and left-to-right, respectively, as they appear on the symbol display screen.

6. The method of claim 3 wherein the symbols as they appear on the symbol display screen are read by the processor in determining outcomes in the first paytable from left-to-right or right-to-left on the symbol display and the symbols are read by the processor in determining outcomes in the second paytable from right-to-left and left-to-right, respectively, on the symbol display screen.

7. The method of claim 4 wherein the symbols as they appear on the symbol display screen are read by the processor in determining outcomes in the first paytable from left-to-right or right-to-left on the symbol display and the symbols are read by the processor in determining outcomes in the second paytable from right-to-left and left-to-right, respectively, on the symbol display screen.

8. The method of claim 1 wherein non-cash and non-credit points may be redeemed for benefits through the player input.

9. The method of claim 8 wherein benefits may include cash, credits, free spins, multipliers, enhanced gameplay, enhanced paytables, player comp rewards or player club points.

10. The method of claim 1 wherein non-cash and non-credit points may be used through the player input to enter a jackpot-related event.

11. The method of claim 1 wherein non-cash and non-credit points may be used through the player input to enter a progressive jackpot-related event.

12. The method of claim 1 wherein portions of wagers by the player are used by the processor to increment a progressive jackpot event and non-cash and non-credit points may be used through the player input to enter a progressive jackpot-related event.

13. The method of claim 1 wherein portions of wagers by the player are used by the processor to increment a progressive jackpot event and only non-cash and non-credit points may be used by the player through the player input to enter the progressive jackpot-related event.

14. A gaming apparatus comprising the player input, the processor and a video monitor as the symbol display screen, the processor containing software enabling the apparatus to perform the method of claim 1.

15. A method of game play on a gaming system using a processor to store credits, a player input system and a symbol display screen, the method comprising:

a player placing an at least first wager through the player input system to play in an underlying game in which at least one set of symbols are provided on the symbol display screen to players making the at least first wager;

each player receiving the at least one set of symbols on the symbol display screen in a round of play;

each at least one set of symbols for each player is evaluated by the processor according to a first paytable and a first determination is made by the processor as to whether the each at least one set of symbols is a winning or losing event, and the first wager is resolved by the processor on a cash or credit basis based on the first determination;

each at least one set of symbols is then evaluated by the processor according to a second paytable and a second determination is made by the processor as to whether the each at least one set of symbols is a winning or losing event, and the first wager or a second wager is resolved by the processor on a non-cash or non-credit point basis based on the second determination; and cash and credit point balances are maintained by the processor in a first account and non-cash and non-credit balances from the second determination are maintained by the processor in a separate account distinct from the first account.

16. The method of claim 15 wherein only a single set of symbols is provided by the processor for display on the symbol display screen and the single set of symbols is evaluated by the processor by two different determinations as the first determination and the second determination.

17. The method of claim 15 wherein two sets of symbols are provided by the processor and each one of the two sets of symbols are evaluated by the processor by a different determination as the first determination and the second determination.

18. The method of claim 15 wherein two sets of symbols are provided by the processor and each one of the two sets of symbols are evaluated by the processor by the same determination as the first determination and the second determination.

19. A gaming apparatus comprising the player input, the processor and a video monitor as the symbol display screen, the processor containing software enabling the apparatus to perform the method of claim 15.

* * * * *